US006972660B1

(12) United States Patent
Montgomery, Jr. et al.

(10) Patent No.: US 6,972,660 B1
(45) Date of Patent: Dec. 6, 2005

(54) SYSTEM AND METHOD FOR USING BIOMETRIC DATA FOR PROVIDING IDENTIFICATION, SECURITY, ACCESS AND ACCESS RECORDS

(75) Inventors: William S. Montgomery, Jr., Dallas, TX (US); Leland H. Cooley, II, Mansfield, TX (US); Robert A. Lunday, Grand Prairie, TX (US)

(73) Assignee: Lifecardid, Inc., Dallas, TX (US)

( * ) Notice: Subject to any disclaimer, the term of this patent is extended or adjusted under 35 U.S.C. 154(b) by 413 days.

(21) Appl. No.: 10/146,656

(22) Filed: May 15, 2002

(51) Int. Cl.[7] .......................... G05B 19/00; G06F 7/00; G06K 19/00; G08B 29/00; H04B 1/00

(52) U.S. Cl. ....................... 340/5.52; 340/5.6; 340/5.7; 340/5.82

(58) Field of Search ............................. 340/5.52, 5.53, 340/5.6, 5.7, 5.71, 5.72, 5.73, 5.82, 5.83, 340/5.84; 235/449

(56) References Cited

U.S. PATENT DOCUMENTS 4,717,816 A 1/1988 Raymond et al.
4,760,393 A 7/1988 Mauch
5,337,043 A * 8/1994 Gokcebay .................. 340/5.67
5,591,950 A 1/1997 Imedio-Ocaña
5,670,940 A * 9/1997 Holcomb et al. ........... 340/543
5,850,753 A 12/1998 Varma
5,887,140 A * 3/1999 Itsumi et al. ............... 709/225
5,903,225 A * 5/1999 Schmitt et al. ............ 340/5.25
5,930,804 A * 7/1999 Yu et al. .................. 707/104.1
5,995,014 A * 11/1999 DiMaria .................... 340/5.52
6,064,316 A * 5/2000 Glick et al. ................ 340/5.65
6,100,811 A 8/2000 Hsu et al.
6,147,608 A * 11/2000 Thacker ................... 340/573.1
6,195,420 B1 2/2001 Tognazzini
6,310,966 B1 * 10/2001 Dulude et al. .............. 382/115
6,426,699 B1 * 7/2002 Porter ...................... 340/568.1
6,484,260 B1 * 11/2002 Scott et al. ................. 713/186
6,624,739 B1 * 9/2003 Stobbe ....................... 340/5.2
6,715,679 B1 * 4/2004 Infosino ..................... 235/449
6,747,564 B1 * 6/2004 Mimura et al. .......... 340/825.6
6,763,336 B1 * 7/2004 Kolls .......................... 705/44

OTHER PUBLICATIONS

"Ultimate Home & Office Security," Biothentication ™ Solution to enforce security of access, http://www.biometricsdirect.com/Web/Sentry_Scan/sentryscan%20DL200.htm, Jun. 14, 2002.

(Continued)

*Primary Examiner*—Michael Horabik
*Assistant Examiner*—Nam Nguyen
(74) *Attorney, Agent, or Firm*—Fulbright & Jaworski LLP

(57) ABSTRACT

Disclosed are systems and methods which determine, to a desired level of certainty, the identities of each individual granted access to an area, room, container, and/or good or service using biometric data. A plurality of access points may be networked to provide access control and/or access record generation on a real time basis. Biometric scanners, electronic locks, and control devices are preferably disposed throughout a hierarchical access facility, such as a hotel, to provide access to areas, rooms, and containers, to acquire information with respect individuals' access thereto, and/or to identify individuals for providing access to goods and services. Such devices may be in communication with one another and/or host systems, such as local hosts and facility servers, via wireline communication, wireless communication, and combinations thereof to thereby provide a pervasive access and access record management system.

11 Claims, 2 Drawing Sheets

OTHER PUBLICATIONS

"Indentix Inc.-Empowering Identification™—Products" [internet—http://www.identix.com/products/pro__access__fv20.html] Access Control FingerScan™ V20, Retrieved on Sep. 12, 2002.

"Datasheet" [internet- http://www.identix.com] IDENTIX® Fingerscan™ V20 UA Retrieved on Sep. 12, 2002.

Ultra-Scan® true identity biometrics™, "Rapid ID Station," Mar. 2001, (12 pages).

Ultra-Scan® true identity biometrics™, "An Entire Family of Open Architecture Figerprint ID Systems," Jan. 2001, (7 pages).

Ultra-Scan® true identity biometrics™, "Backgrounder," Ultra-Scan Backgrounder, Mar. 2002 (7 pages).

* cited by examiner

SYSTEM AND METHOD FOR USING BIOMETRIC DATA FOR PROVIDING IDENTIFICATION, SECURITY, ACCESS AND ACCESS RECORDS

TECHNICAL FIELD

The present invention relates generally to providing for identification of individuals and, more particularly, to the identification of individuals for access control and access records.

BACKGROUND OF THE INVENTION

Safety, security, access control, and theft prevention are serious concerns with respect to the operation of a hotel or other facility having a relatively large population, having different levels of access privileges, moving therethrough (referred to herein as a hierarchical access facility). For example, hotels and motels have a large number of transient guests and visitors as well as a large number of staff, including many unskilled and semi-skilled laborers, which must be granted access to various areas, rooms, and containers thereof throughout the day and night. However, the areas, rooms, and containers to which such access must be granted often contain valuables, guest belongings, fixtures and furnishings, accessories, stock and supplies, and the like which require protection from pilfering. Even more importantly, individuals requiring security and/or privacy may be within such areas and rooms.

Currently, there is no effective methodology for adequately controlling access and compiling access information with respect to such hierarchical access facilities. Accordingly, there are unacceptably high rates of theft and loss of property in hotel rooms, for example, because there is no methodology for determining who of a number of individuals, including guests, service personnel, maintenance personnel, or other persons, has actually accessed the room. In the case of one relatively small luxury hotel, having on the order of 85 rooms and suites, the loss rate associated with pilferage of guest belongings, hotel fixtures and furnishings, and accessories, was on the order of $2.5 million dollars a year in the years 2000 and 2001.

Existing methodologies for providing access with respect to areas, rooms, and containers have typically used a conventional key and lock system and/or a magnetic strip card that activates an electronic lock. For example, a guest may be given a conventional key to access an assigned hotel room and a different conventional key to access a services container, or "mini-bar," within the hotel room. Alternatively, a guest may be given a magnetic strip card to access an assigned hotel room and a conventional key to access a mini-bar within the hotel room. Often other controlled access containers are available for the guest's use, such as athletic lockers, lock boxes, and/or room safes. Each such additional controlled access container requires yet another conventional key or perhaps a combination.

The guest's hotel room key, whether a conventional key or a magnetic strip card, may additionally provide access to other areas within the hotel, such as to a side entrance locked after dark, to a pool facility, to an exercise facility, and the like. Similarly, hotel staff may be given conventional keys and/or magnetic strip cards to access guest rooms and/or other areas of the facility.

However, none of the above access methodologies is able to identify with any certainty who has actually accessed any area, room, or container within the hotel, neither to the level of guest or staff nor the particular individual. For example, magnetic strip cards and conventional keys may be lost, stolen, borrowed, or loaned. Similarly, magnetic strip cards and conventional keys may be duplicated or forged. Accordingly, it is not possible to determine with confidence who has been given access to an area, room, or container using such keys as the key technologies that exist today do not provide any method for identifying the user of the key. That is to say, the prior art keys, whether conventional key or magnetic strip card, can grant a person access to a room, area, or container serviced by a lock mechanism, but there is no way to identify the user of that key.

Moreover, there is generally no technique for preventing hotel staff from entering an occupied room without requiring a guest to take action. For example, guests may be given the ability to prevent hotel staff from entering a guest's room while occupied only by the guest throwing a deadbolt and/or attaching a door chain when inside the room.

In the present art there is no methodology for hotel staff to determine the identity of an individual signing a check for guest services or making a purchase in a shop at the facility and/or to confirm that the individual is in fact a current guest of the facility and in good standing. For example, a common technique is for hotel staff to request a room key from an individual for identification and/or confirmation. However, as mentioned above, the room key could be stolen etcetera. Accordingly, a hotel and its staff do not know with absolute certainty, that the individuals making purchases are who they say they are.

Likewise, in the present art there is no methodology for management to determine whether or not particular staff members are working where they are supposed to be, when they are supposed to be, and for the length of time they are supposed to be, short of management physically verifying the particular staff members' location throughout the day.

A need, therefore, exists in the art for systems and methods which provide identification of the individual given access to an area, room, or container to a desired level of certainty. A further need exists in the art for such systems and methods to develop access records, such as for discouraging pilferage and/or identifying those responsible for pilferage. Similarly, a need exists in the art for such systems and methods to develop access records for tracking the activities of individuals, such as to monitor the work of staff. A yet further need exists in the art for such systems and methods to provide identification of individuals for acquiring goods and services. A still further need exists in the art for systems and methods to provide prevention of access to an area, room, or container by particular individuals under particular circumstances, such as to prevent staff from entering a room occupied by a guest, without requiring specific preventive action by individuals.

BRIEF SUMMARY OF THE INVENTION

The present invention is directed to systems and methods which determine, to a desired level of certainty, the identities of each individual granted access to an area, room, container, and/or good or service using biometric data. Preferably, a plurality of access points or user devices are networked to provide access control and/or access record generation on a real time basis. Accordingly, the nature and cause of property losses, pilferage, and theft may be identified and/or prevented according to embodiments of the present invention.

According to a preferred embodiment of the present invention, biometric scanners, electronic locks, and control devices are disposed throughout a hierarchical access facility, such as a hotel, to provide access to areas, rooms, and containers, to acquire information with respect individuals' access thereto, and/or to identify individuals for providing access to goods and services. Such devices may be in communication with one another and/or host systems, such as local hosts and facility servers, via wireline communication, wireless communication, and combinations thereof to thereby provide a pervasive access and access record management system.

Additional or alternative devices may be coupled to the access and access record management system and/or the above mentioned devices may be specifically adapted to provide a robust system for use in particular environments. For example, electronic door locks, electronic safe locks, electronic refrigerator locks, electronic HVAC thermostat controls, motion detectors, room occupancy display panels, point of sale terminals, and wireless portable biometric interfaces may all be included in an access and access record management system of the present invention deployed in a hotel environment.

In operation, an individual's data may be input into the system at an input station, such as at the registration desk of a hotel. Preferably, the individual's biometric data, such as a fingerprint, is sampled and stored by a host system of the present invention. This biometric data may be associated with particular privileges, such as access to particular areas, rooms, and/or containers, the ability to obtain goods and services on credit, and the like. This information may be propagated to appropriate system nodes, such as hosts local to particular venues for which access privileges are to be granted, systems disposed in retail shops and restaurants, and the like. Thereafter, the individual may obtain access or other permitted privileges by supplying the appropriate biometric data.

For example, an individual may obtain access to an assigned guest room, an electric safe within the guest room, a mini-bar, etcetera by placing an appropriate finger upon a corresponding biometric scanner. Similarly, an individual may be allowed to charge the cost of goods or services to a guest room account by placing an appropriate finger upon a corresponding biometric scanner.

It should be appreciated that granting access to individuals is not limited to a single class of such individuals. Accordingly, in addition to granting access to particular areas, rooms, and containers to individuals who are guests of a hierarchical access facility, systems of the present invention provide access for other classes and sub-classes of individuals, such as hotel staff which may be divided into housekeeping, management, service, wait staff, bellmen, etcetera. Moreover, different access privileges may be provided based upon the particular individual, class of individual, sub-class of individuals, etcetera.

Preferably, systems of the present invention operate in real-time to verify the identity of the individual and to determine the appropriate level of access to be granted. For example, a guest may be permitted access to an assigned guest room as well as an exercise room provided for guest use at anytime of the day during the guest's stay at a hotel. In contrast, a member of the housekeeping staff may be permitted access to a limited number of guest rooms for which this individual has housekeeping duties as well as a supply closet storing housekeeping supplies and equipment. However, the access granted to the member of the housekeeping staff may be limited in time, such as to the hours of a particular housekeeping shift.

Additionally, the real-time determinations of the present invention may identify particular situations for which access should not be granted, although otherwise the access would be grantable. For example, the systems of the present invention may not only provide a guest access to a guest room, but may further monitor the guest's occupancy of the room to thereby prevent housekeeping staff from accessing the room when occupied. Similarly, a guest may not be permitted to charge a meal in the hotel restaurant, such as where the identification verification indicates the guest has exceeded a credit limit or has already checked out of the hotel.

In addition to granting the proper access to the individual, preferred embodiments of the present invention accumulate access records. Such information may be acquired from the use of the aforementioned devices and may be useful in determining who has been given access to a particular area, room, or container at particular times to combat theft. Additionally or alternatively, such information may be utilized for management functions such as time and attendance of employees, determining usage patterns of resources for staffing or marketing purposes, etcetera.

A technical advantage of the present invention is provided through identification of the individual given access to an area, room, or container to a desired level of certainty. A further technical advantage is provided through identification of individuals for acquiring goods and services. A yet further technical advantage provided by the present invention is the development of detailed and useful access records. A still further technical advantage of the present invention is provided through prevention of access to an area, room, container, good, or service by particular individuals under particular circumstances.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
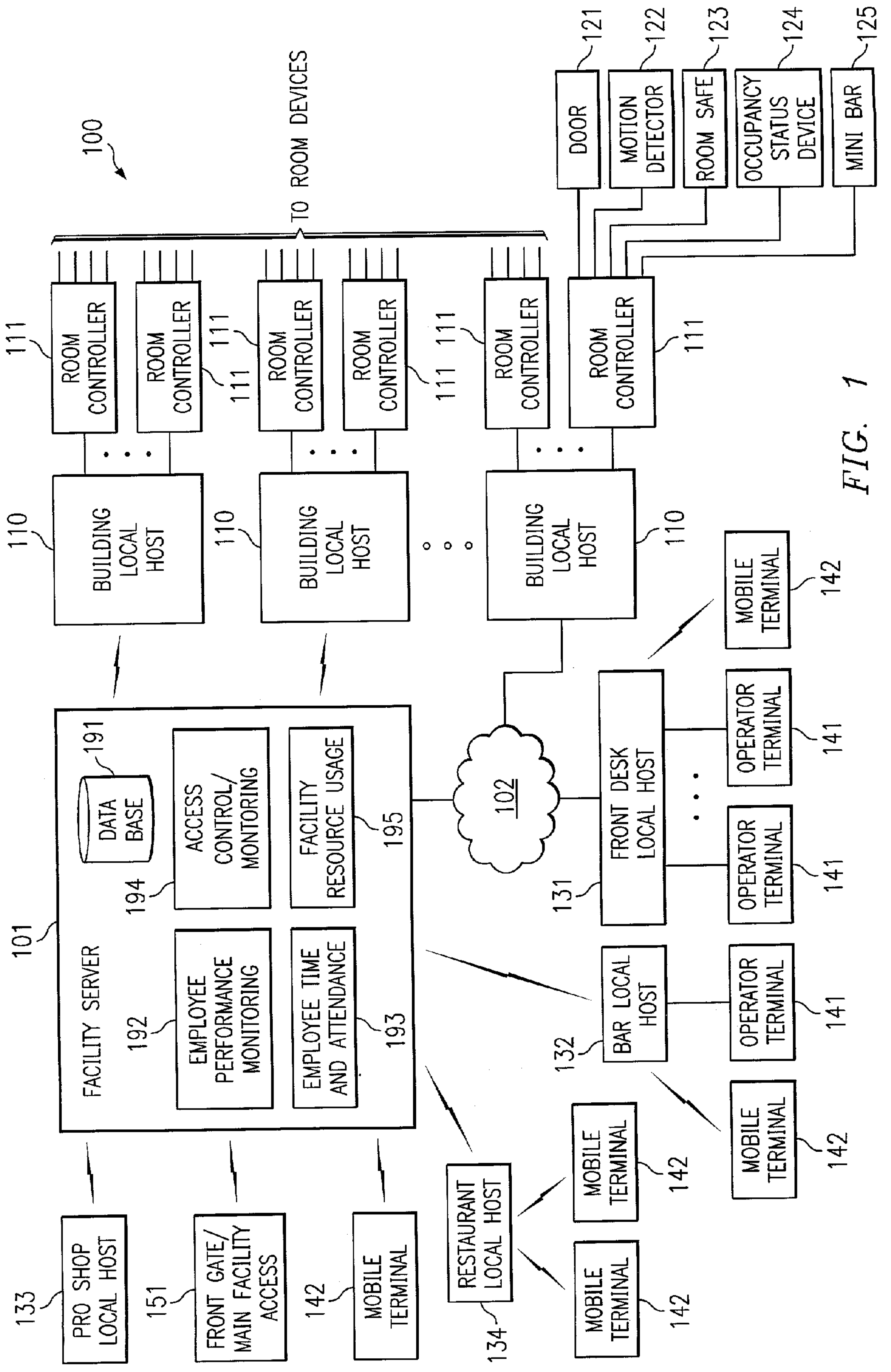
FIG. 1 shows a block diagram of a system operable according to the present invention.

Embodiments of the present invention are adaptable to provide access and access records with respect to any number of hierarchical access facilities, such as hotels, office buildings, hospitals, assisted care residences, and the like. However, in order to better enable the reader to understand the concepts of the present invention, a preferred embodiment system and method adapted for use with respect to a hotel environment will be described. It should be appreciated that the present invention and the appended claims are not limited to the aspects described herein with reference to the preferred embodiment.

Preferably, systems and methods of the present invention operate to determine, to a desired level of certainty, the identities of each individual granted access to an area, room, container, and/or good or service using biometric data. Accordingly, a plurality of access points or user devices are preferably networked throughout the aforementioned hotel environment to provide access control and/or access record generation on a real time basis. Specifically, according to a preferred embodiment, biometric scanners, electronic door locks, electronic safe locks, electronic refrigerator locks, electronic HVAC thermostat controls, motion detectors, room occupancy display panels, point of sale terminals, wireless portable biometric interfaces, and control devices are disposed throughout the hotel. Such devices may be in communication with one another and/or host systems, such as local hosts and facility servers, to provide access to areas, rooms, and containers, to acquire information with respect individuals' access thereto, and/or to identify individuals for providing access to goods and services and thereby provide a pervasive access and access record management system.

For example, a preferred embodiment of the present invention comprises a biometric scanner in communication with a facility server, wherein a guest upon registration at the hotel may provide biometric identification for sampling and association with pertinent guest data within a database of the facility server. The facility server may provide appropriate information to other systems of the network, such as local hosts and/or controllers associated with the guest's assigned guest room, retail shop point of sale systems, local hosts and/or terminals associated with guest services, and the like.

A biometric scanner and electric door lock may be disposed at the entrance to a guest room. The biometric scanner and electric lock may be in communication with a control device associated with the guest room. Similarly, other guest room devices may be in communication with the control device, such as a biometric scanner and electric refrigerator door lock, a biometric scanner and electric safe lock, a HVAC thermostat, and a motion detector might all be in communication with a control device associated with a particular guest room.

The control device may, in turn, be in communication with a local host associated with a group of guest rooms. The local host may receive appropriate information, such as the aforementioned biometric data and/or other pertinent guest data, from the facility server for real-time identification, access, and/or access record keeping according to the present invention. Similarly, the local host may provide information, such as the identity of the individual, the particular resource for which access was requested, the time such access was attempted, etcetera, to the facility server for updating of a database, analysis, and/or other purposes.

Accordingly, a guest may present the appropriate finger for scanning by the biometric scanner disposed near the door to an assigned guest room for entry into that room. The controller device may receive the biometric data from the biometric scanner and send control signals to the electric lock, such as after communicating with the local host to analyze the biometric data and for acknowledgement or repudiation of the identity of the individual. Other areas, rooms, or containers, such as hotel athletic facilities and/or spas, may be accessed similarly. For example, once inside a guest room, the guest may present the appropriate finger for scanning by the biometric scanner disposed upon the mini-bar refrigerator for access to the contents thereof.

Preferably, the guest room access system is adapted to monitor when a guest is present to prevent others, such as hotel housekeeping staff, from accessing the guest room when occupied. For example, the aforementioned motion detector may be utilized to determine that a guest has entered or remained in a guest room after unlocking or opening of a door. Accordingly, a housekeeper may be denied access when the housekeeper places the appropriate finger upon the biometric scanner associated with that guest room's door, although the housekeeper might otherwise be granted access. Additionally or alternatively, a display panel may be provided, such as in the proximity of the aforementioned biometric scanner, to indicate that the room is occupied.

It should be appreciated that access provided to such individuals is not limited to entry into areas, rooms, containers, and the like, but may include access to various goods and services. For example, wait staff in a hotel restaurant may carry portable electronic devices having biometric signature reading technology included therein to allow a guest to charge a meal to an assigned guest room. Similarly, a point of sale terminal in a hotel golf pro-shop may have biometric signature reading technology coupled thereto to allow a guest to charge greens fees to an assigned guest room.

Directing attention to FIG. 1, a block diagram of preferred embodiment pervasive access and access record management system 100 according to the present invention is shown. Access and access record management system 100 is specifically adapted for use with respect to a hotel environment, such as may include a front desk, guest rooms, and various guest services, such as restaurants, bars, spas, and athletic facilities. The hotel environment may present a number of different configurations which the systems of the present invention may accommodate. For example, the hotel environment may comprise a single building, possibly divided into floors and/or wings. Alternatively, the hotel environment might comprise a campus of buildings, such as a resort having guest bungalows and/or free standing buildings housing various guest services.

The preferred embodiment provides a network system in which a centralized server, facility server 101, provides data processing, data storage, and/or data communication with respect to a number of localized hosts, local hosts 110 and 131–134, deployed at various locations within the environment. The localized hosts may, in turn, provide data processing, data storage, and/or data communication with respect to various user devices, user devices 121–125, 141, 142, and 151. Such user devices may be coupled to local hosts through a controller, e.g., controllers 111, to provide signal arbitration therebetween. However, user devices, such as operator terminals 141 and mobile terminals 142, for example, may themselves include circuitry and logic for use in direct communication with host systems according to the present invention. Likewise, user devices, such as user devices 142 and 151, for example, may include circuitry and logic for use in direct communication with a centralized server of the present invention. Similarly, local hosts, such as local host 133, for example, may include circuitry and logic for providing user device functionality according to the present invention, if desired.

Information communication between the various devices of system 100 may be provided via wireline communication, wireless communication, and combinations thereof. For example, direct wireline connections such as a serial communications cable (not shown) may be utilized in providing communications between devices of system 100. Similarly, wireline networks, such as may comprise the public switched telephone network (PSTN), cable transmission systems, the Internet, local area networks (LANs), metropolitan area networks (MANs), and/or wide area networks (WANs) (all represented by network 102), may be utilized in providing communications between devices of system 100. Additionally or alternatively, wireless communication links, such as radio frequency (RF) and/or light energy links, may be utilized according to the present invention. Accordingly, information communication according to the present invention may be provided using various communication protocols and schemes, such as Internet protocol (IP), Ethernet, IEEE 802.11, Bluetooth, infrared (IR), time division multiple access (TDMA), frequency division multiple access (FDMA), code division multiple access (CDMA), time division multiplexing (TDM), frequency division multiplexing (FDM), and the like.

Accordingly, facility server 101 of the preferred embodiment comprises a processor-based system with wireless and wireline communications capabilities, providing a central hub for the different areas that are serving the facility. Although a single server is shown, it should be appreciated that multiple servers may be utilized, such as to distribute processing among a number of similarly configured servers for performance and/or fault tolerance or to provide a number of servers each configured to provide particular features and functions according to the present invention.

Facility server 101 is preferably embodied in a general purpose processor-based system, such as a micro-computer system operable upon the INTEL PENTIUM family of processors, as are well known in the art. Accordingly, facility server 101 may comprise a central processing unit (CPU), memory (random access memory (RAM), read only memory (ROM), bulk memory (e.g., floppy disk, hard disk, and/or optical disk memory)) and appropriate input/output (I/O) interfaces (user I/O interfaces, such as a pointing device, keyboard, display monitor, printer, microphone, speakers, and scanner, and communication interfaces, such as a network interface card (NIC), serial port, printer port, universal serial bus (USB), RF, and IR). Preferably, facility server 101 operates under control of an operating system such as MICROSOFT WINDOWS NT or 2000 and application programs providing functionality according to the present invention, such as employee performance monitoring 192, employee time and attendance 193, access control/monitoring 194, and facility resource usage 195 storing user, access, and access record information in database 191.

The various local hosts of system 100 are preferably embodied in general purpose processor-based systems, such as a micro-computer systems operable upon the INTEL PENTIUM family of processors. Accordingly, each of local hosts 110 and 131–134 may comprise a central processing unit (CPU), memory (RAM, ROM, bulk memory (e.g., floppy disk, hard disk, and/or optical disk memory), and appropriate I/O interfaces (user I/O interfaces, such as a pointing device, keyboard, display monitor, printer, microphone, speakers, and scanner, and communication interfaces, such as a NIC, serial port, printer port, USB, RF, and IR). Preferably, the local hosts operate under control of an operating system such as MICROSOFT WINDOWS and application programs providing functionality according to the present invention.

According to the illustrated embodiment, various communications links, including wireline and wireless links, are utilized in providing information communication between facility server 101 and local hosts 110 and 131–134. For example, wireline links may be utilized where local hosts are disposed relatively near the facility server, where existing wireline communication infrastructure is available, or where deploying wireline links as needed is acceptable. Wireless links may be utilized where local hosts are disposed relatively remote from the facility server, such as in a separate building or on a different floor, where existing wireline communication infrastructure or capacity is not available, or where deploying wireline links as needed is otherwise unacceptable.

With reference to the particular illustrated local hosts, front desk local host 131 may operate under control of an application program providing guest registration, check-in, check-out, reservation, room assignment, invoicing, and other functions performed at the front desk of a hotel in addition to biometric and user data acquisition, identity verification, access authorization, and access information accumulation according to the present invention. Accordingly, one or more user devices, such as operator terminals 141 and/or mobile terminals 142, may be coupled to front desk local host 131 for use by front desk staff, management, concierge, bellmen, service personnel, housekeeping, and/or guests for providing a user interface and input and output of information.

Operator terminals 141 may comprise a computer workstation, such as a microcomputer configured substantially as described above with respect to facility server 101 and the local hosts. However, operator terminals 141 may comprise additional or alternative aspects useful for providing real-time user devices according to the present invention. For example, operator terminals 141 preferably comprise a biometric scanner coupled thereto for acquisition of biometric data. Additionally, operator terminals 141 may include point of sale attributes, such as a cash drawer, credit card magnetic stripe reader, bar code scanner, printer, and the like. Operator terminals 141 of the present invention may additionally or alternatively include a variety of other aspects as may be useful in particular implementations, such as multimedia I/O (microphone, speakers, camera, etcetera) to provide for video conferencing, teleconferencing (such as by voice over IP), and/or capturing of images of individuals.

Operator terminals 141 may be operable under control of an operating system, such as MICROSOFT WINDOWS, and an application program providing desired user interfacing. It should be appreciated that functionality of the corresponding local host application program may be implemented upon operator terminals 141 coupled thereto, if desired.

Mobile terminals 142 may comprise a portable computing device, such as a pocket PC (e.g., the COMPAQ IPAQ or HEWLETT PACKARD JORNADA hand held microcomputers), preferably having a CPU, memory, display screen, input device, and wireless communications interface. Wireless interfaces utilized by mobile terminals 142 may comprise an IR interface and/or a RF interface. RF interfaces, such as those communicating according to the IEEE 802.11 standard, may be preferred in situations where communications over appreciable distances are desired. IR interfaces may be preferred in situations where communications within very close proximity of a local host or other communications node are desired. For example, in a restaurant setting, IR interfaces might be used where wait staff batches orders and/or payment validation from a mobile terminal at a hostess stand. Of course, such batch processing may be provided using a docking cradle or other hardwired interface, if desired.

Mobile terminals 142 preferably comprise a biometric scanner for acquisition of biometric data. Additionally, mobile terminals 142 may include point of sale attributes, such as a credit card magnetic stripe reader, bar code scanner, printer, and the like. Mobile terminals 142 of the present invention may additionally or alternatively include a variety of other aspects as may be useful in particular implementations, such as multimedia I/O (microphone, speakers, camera, etcetera).

Mobile terminals 142 may be operable under control of an operating system, such as MICROSOFT WINDOWS CE, and an application program providing desired user interfacing. It should be appreciated that functionality of the corresponding local host application program may be implemented upon operator terminals 142 coupled thereto, if desired.

According to the illustrated embodiment, various communications links, including wireline and wireless links, are utilized in providing information communication between local hosts and the user devices. For example, wireline links may be utilized where user devices are disposed relatively near the local hosts, where the user device is to remain stationary, where existing wireline communication infrastructure is available, or where deploying wireline links as needed is acceptable. Wireless links may be utilized where user devices are disposed relatively remote from the local hosts, where the user device is to be easily transportable, where existing wireline communication infrastructure or capacity is not available, or where deploying wireline links as needed is otherwise unacceptable.

Although many user devices are shown coupled to local hosts, it should be appreciated that various user devices of the present invention may be placed in communication with facility server 101 without an intervening local host, if desired. For example, front gate/main facility access device 151 may be disposed at a main entrance driveway, separated from buildings of the compound, to provide controlled access to the property, such as during nighttime hours. Accordingly, front gate/main facility access device 151, preferably including a biometric scanner and electronic mechanism for opening a gate or other barricade, may communicate with facility server to provide access to the property when an individual submits proper biometric data.

Similarly, a particular mobile terminal 142 may be configured for registering a guest, including capturing of biometric data and other guest information, which is highly portable. This particular mobile terminal 142 might be utilized in a limousine to perform registration steps with respect to a guest during a ride from an airport to the hotel. Upon entering the hotel campus, the portable terminal may communicate directly with the facility server to upload the guest information, and perhaps download responsive information (such as an assigned guest room), thereby allowing the guest to proceed directly to an assigned room. Additionally or alternatively, such a mobile terminal may be configured to use an existing wireless network, such as a cellular or personal communication system (PCS) commercial network, to provide communication of such information to devices of system 100. Likewise, various communication nodes (not shown) may be coupled to the facility server and disposed throughout the environment to provide information communication where a local host and/or facility server does not otherwise provide such communications.

Bar local host 132 and restaurant local host 134 may operate under control of application programs providing order entry, invoicing, inventory control, and other functions performed at a bar or restaurant of a hotel in addition to biometric and user data acquisition, identity verification, access authorization, and access information accumulation according to the present invention. Accordingly, one or more user devices, such as operator terminals 141 and/or mobile terminals 142, may be coupled to bar local host 132 and restaurant local host 134 for use by wait staff, cooks, bartenders, maitred, cashiers, and/or guests for providing a user interface and input and output of information.

Pro-shop local host 133 may operate under control of an application program providing point of sale, inventory control, tee time scheduling, tennis court scheduling, turf management, and other functions performed at a hotel sports pro-shop in addition to biometric and user data acquisition, identity verification, access authorization, and access information accumulation according to the present invention. Although one or more user devices, such as operator terminals 141 and/or mobile terminals 142, may be coupled to pro-shop local host 133, the illustrated embodiment provides user interface and input and output of information directly through local host 133. Accordingly, a situation in which a small number of users/transactions are expected may be readily accommodated with a minimum of devices.

Building local hosts 110 preferably serve as a gateway for all the rooms located in a building, such as where multi-unit bungalows are included in the hotel environment, or clusters of rooms, such as where a building contains a large number of rooms. Accordingly, building local hosts 110 may operate under control of application programs providing identity verification, access authorization, and access information accumulation according to the present invention. Preferably, one or more user devices, such as door device 121, motion detector 122, room safe device 123, occupancy status device 124, and/or mini-bar device 125, may be coupled to building local host 110 for use by staff and guests for providing a user interface and input and output of information.

For example, door device 121 may comprise a biometric scanner disposed outside of a guest room and a corresponding electronic door lock mechanism disposed in the door to the guest room to facilitate entry of a guest room in response to an appropriate finger having been placed upon the biometric scanner. Motion detector 122 may comprise passive infrared (PIR) motion detector, or other motion or proximity detector, disposed within a guest room to provide information with respect to an individual's entry and/or presence in the room. Room safe device 123 may comprise a biometric scanner disposed outside of a room safe and a corresponding electronic safe lock mechanism disposed in the safe to facilitate access to the safe in response to an appropriate finger having been placed upon the biometric scanner. Occupancy status device 124 may comprise a display panel, such as may include light emitting diode (LED) and/or liquid crystal display (LCD) technology, disposed outside of a guest room, such as in proximity to the biometric scanner of door device 121, to indicate a status with respect to the occupancy of the room. Mini-bar device 125 may comprise a biometric scanner disposed outside of a mini-bar refrigerator or other enclosure and a corresponding electronic door lock mechanism disposed in a door thereof to facilitate access to the mini-bar in response to an appropriate finger having been placed upon the biometric scanner.

It should be appreciated that biometric scanners utilized according to the present invention may be relatively small and self contained units, perhaps powered by a small direct current power source, having an area for placing a finger for scanning of the surface topology thereof. Preferably, a unique vector representation of the finger surface topology is derived from the scan for further processing and comparison according to the present invention. A commercially available biometric scanner which may be utilized according to the present invention is the Secure Touch 2000 fingerprint scanner available from Biometric Access Corporation, Round Rock, Tex.

The electronic lock mechanisms utilized according to the present invention may also be relatively small and self contained units, perhaps powered by the same small direct current power source as the above described biometric scanners. Various electronic lock mechanisms may be utilized according to the present invention, such as depending upon the level of security desired, the configuration of the area, room, or container secured, etcetera. For example, an electronic lock mechanism utilized according to the present invention for a safe lock may comprise a normally thrown bolt, wherein an electric solenoid is energized to retract the bolt when access is to be granted. An electronic lock mechanism utilized according to the present invention for a door lock may comprise a normally closed striker plate which incarcerates a bolt of a lock or doorknob mechanism, wherein a portion of the striker plate is electronically released to allow the bolt to pass when access is to be granted. Commercially available electronic lock mechanisms which may be utilized according to the present invention include the 5190S and 5191S12 electronic lock mechanism available from Schlage Commercial Lock Division, San Francisco, Calif.

According to the preferred embodiment, room controllers 111 are coupled to a plurality of room devices to provide interfacing, signal processing, and/or other functionality in support of the operation of the room devices according to the present invention. For example, room controller 111 may comprise a direct current switching power supply to provide power to the various room devices of a guest room, thereby eliminating the need for each such device to include its own such power supply. Additionally or alternatively, room controller 111 may provide signal processing and buffering, or other gateway functionality, such that raw data signals provided by a biometric scanner may be received as an access query by a building local host and an access grant or denial from the building local host may be received as a proper control signal by an electronic lock mechanism. Accordingly, room controller 111 of the preferred embodiment may include circuitry and logic, perhaps including firmware and associated signal inputs and outputs, to provide desired interoperability between building local hosts 110 and room devices 121–125. A commercially available controller circuit board which may be utilized according to the present invention is the SPC-1 control board available from Industrial Logic, Saint Louis, Mo.

According to the illustrated embodiment, multiple room devices are coupled to a room controller and, in turn, multiple room controllers are coupled to a building local host. This tree architecture provides an efficient distribution of processing power to provide the access and access record functionality of the present invention. However, it should be appreciated that there is no limitation that the present invention utilize such a tree architecture. For example, a single room device may be coupled to a room controller and/or a single room controller coupled to a building local host. Alternatively, room devices of multiple rooms may be coupled to a single room controller, such as where a small number of room devices are associated with each guest room.

Moreover, it should be appreciated that the distributed architecture illustrated need not be utilized according to the present invention. For example, various room devices may be coupled directly to a facility server, such as where physical distances are not great and/or where the volume of access transactions is expected to be small and, thus, distributed processing is not desired for processing speed considerations.

Although building local hosts 110, room controllers 111, and room devices 121–125 have been described above with reference to guest rooms, it should be appreciated that their use is not so limited. For example, a particular building local host may serve guest rooms and/or other areas or rooms of the environment. Accordingly, a room controller coupled thereto may provide gateway functionality for a number of room devices disposed in an athletic facility, conference room, restroom, cabanas, spa, and/or the like. For example, an indoor swimming pool may be located near a cluster of guest rooms such that a building local host controls access with respect to both the guest rooms and the swimming pool.

It should be appreciated that the above described local host configurations and devices coupled thereto are exemplary of configurations which may be implemented according to the present invention. Other local host and coupled device configurations may be used in addition to or in the alternative to those described above, depending upon the environment being served and the features of that environment. For example, other local host configurations may include local hosts and user terminals configured for use in a hotel gift shop, a florist shop, a parking garage, etcetera.

Irrespective of the particular configuration of a local host and its associated user devices, functionality provided by local hosts of the preferred embodiment include identification of individuals, processing of access requests, and acquisition of access record information. Accordingly, front desk local host 131 obtains individuals' biometric data and other information and uploads that information to facility server 101. Similarly, bar local host 132 and restaurant local host 134 validate meal and drink purchases made by guests and upload those to facility server 101. Pro-shop local host 133 validates sporting goods and services purchased by guests and upload those to facility server 101.

Figure 2:
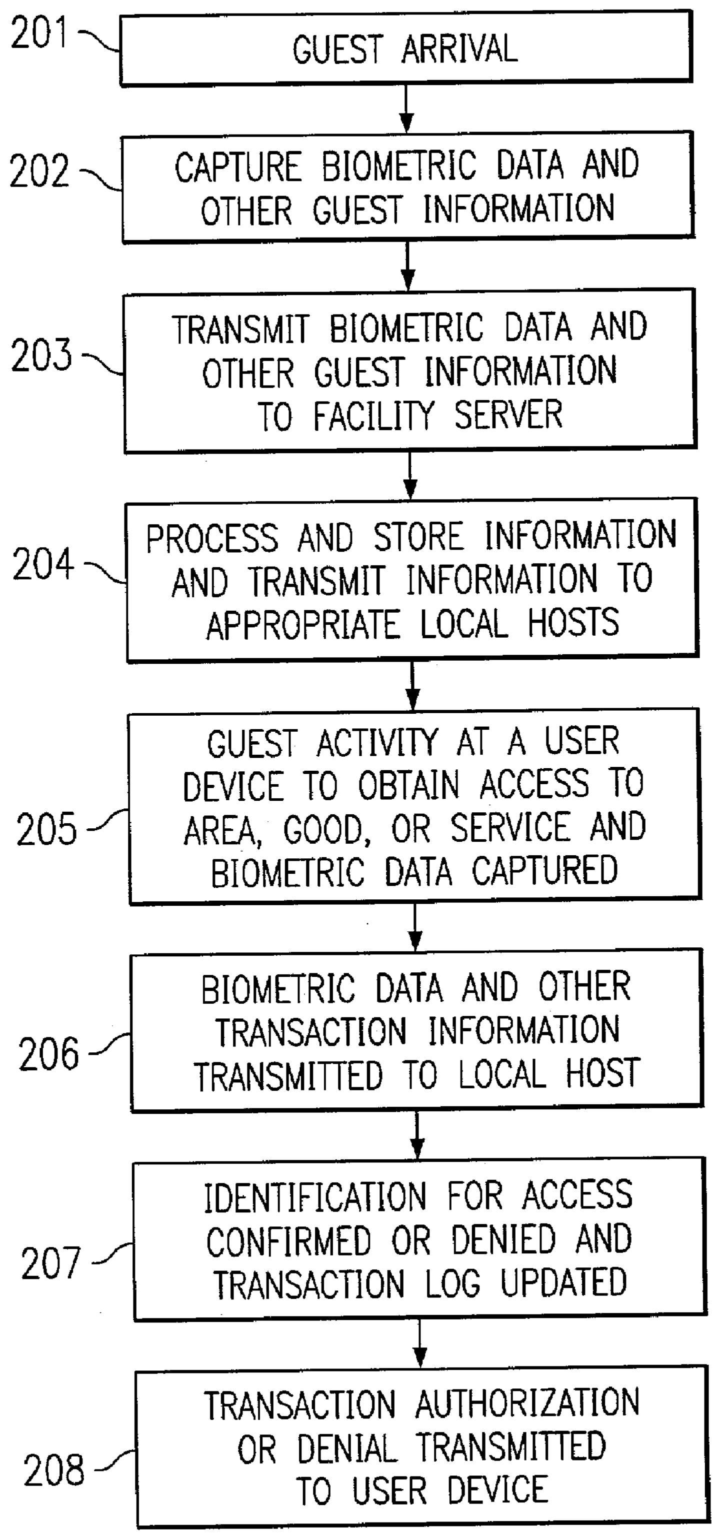
FIG. 2 shows a flow diagram of operation of the system of FIG. 1 according to a preferred embodiment of the present invention.

Directing attention to FIG. 2, a flow diagram of operation of system 100 according to a preferred embodiment of the present invention is shown. At step 201 a guest arrives, such as by presenting himself at a front desk of a hotel. At step 202 guest biometric data and other information is preferably captured, such as by hotel front desk staff operating an operator terminal 141 and/or mobile device 142 in communication with front desk local host 131. For example, the guest may be requested to place a finger upon a biometric scanner for sampling of biometric data, asked to provide a credit card for payment, and queried for information with respect to his stay, his preferences, the services requested, number of guests in the party, etcetera.

It should be appreciated that, where the party includes multiple guests, each such guest may be requested to place a finger upon the biometric scanner for sampling of biometric data for providing access to an assigned room etcetera. For example, according to a preferred embodiment, all guests, and perhaps all individuals given access to the hotel, are required to provide such sample information to facilitate full and complete access records according to the present invention. Information may be additionally be collected with respect to what resources such additional party members are to be allowed to access. Additionally or alternatively, techniques for a guest allowing members of a party to be provided access, perhaps on a limited basis, may be implemented according to the present invention. For example, a registered guest may place a finger upon a biometric scanner to have his identity confirmed and then may allow another individual to place a finger upon the biometric scanner to be added as an individual authorized to access that particular resource. The user device used for adding such additional authorized individuals may include a setting for a "learn" mode of operation to indicate the desire to add additional authorized individuals. Alternatively, such a "learn" mode may be implemented by particular actions, such as rather than opening a door after the guest has been identified according to the present invention the individual to be added as an authorized individual places his finger upon the biometric scanner within a predetermined window of time.

At step 203 the biometric data and other guest information is preferably transmitted by the local host to facility server 101. Facility server 101 preferably processes and stores the guest information, such as within database 191, at step 204. For example, the guest information may be parsed to store information in appropriate fields or for communication to appropriate devices. Additionally or alternatively, the guest information may be analyzed to determine if the particular individual has been a guest before and, if so, to associate a previously acquired knowledge base with the guest.

Step 204 of the preferred embodiment further operates to transmit appropriate guest information to various devices of system 100. For example, guest biometric data may be transmitted to appropriate ones of the local hosts, such as a building local host associated with an assigned room, a building local host associated with common use facilities, and local hosts associated with shops, restaurants, and bars, for real-time and immediate access by the guest. Additionally, guest information, such as guest preferences, may be transmitted to appropriate local hosts. For example, guest preferences with respect to room thermostat settings, television channels watched, and mini-bar item selections, such as may have been learned by the system during a previous stay and/or as may be queried from the guest at registration, may be transmitted to the corresponding devices coupled to local hosts of the present invention. The use of such information may implement additional steps, such as housekeeping staff referencing a mobile terminal or the mini-bar itself to determine an appropriate mix of items for stocking therein.

At step 205, a guest attempts to gain access to an area, a room, a container, a good, or a service of the hotel. For example, a guest may dine in a restaurant and present the appropriate finger for scanning by mobile terminal 142 to have the meal charged to his room. Similarly, a guest may attempt to access a guest room by placing the appropriate finger upon a biometric scanner of door device 121.

At step 206, the captured biometric data and other transaction data is preferably provided to an appropriate local host for verification of the identity of the individual and a determination if access should be permitted. For example, at step 207 the biometric data may be compared to previously sampled biometric data of those individuals for which access is to be authorized. According to the preferred embodiment, such a determination is made without the need for communication with the facility server in order to optimize the speed of the determination as well as to lessen the impact upon facility server processing required. Accordingly, the local hosts may store information such as biometric data of individuals, the resources they are authorized to access, and any access restrictions or limitations (such as times of day, number of accesses allowed, whether they are allowed access when other individuals are present or have been give access, etcetera) for comparing biometric data obtained by a user device and making access determinations in real-time.

However, data communication is preferably provided between the local hosts and the facility server for use with such transactions, if desired. For example, particular situations, such as an extremely large purchase amount associated with the transaction, may trigger communication with the facility server for confirmation that the individual's status has not been changed and the access should be permitted. Additionally or alternatively, access transaction information, such as the time of the transaction, the identity of the individual requesting the transaction, the particular access authorized or declined, etcetera, may be transmitted to the facility server by the local hosts for updating a transaction log, such as may be stored in database 191. Of course, such transaction log communication may be batched, such as to occur during periods of lessened activity, if desired.

At step 208, the access transaction is authorized or denied as appropriate. For example, a local host may provide a control signal for allowing the requested access where the individual's identity is verified and any other access criteria are met. Accordingly, the door device may release a bolt allowing the individual to pass, a charge may be accepted to the guests room and thus the restaurant bill is settled, or any other access transaction completed in accordance with the particular transaction. Alternatively, the access may be denied resulting in the requested access being prevented.

It should be appreciated that, in addition to providing access to individuals in real-time, preferred embodiments of the present invention accumulate data useful for a variety of purposes. For example, pilferage and other thefts may be deterred because positive identification of individuals having access to an area in which such thefts occurred is maintained. Similarly, purchases of services on accounts are assured to be made by individuals authorized to make such purchases. Utilization of particular resources, such as swimming pools, exercise equipment, water sports equipment, golfing equipment, and the like may be accurately monitored, not just for total use, but for such characteristics as peak usage days/times, particular individuals or the demographics of individuals using them, etcetera. Accordingly, staffing assignments, equipment purchases and maintenance schedules, and marketing efforts may be better tailored to serve the guests. Information collected with respect to a guest having entered a room and/or information with respect to the guest currently occupying the room, such as may be provided using the aforementioned motion detector device, may be utilized to prevent the guest from being disturbed by housekeeping staff. Management may monitor the performance of employees, such as by tracking the number of rooms accessed, and perhaps the length of the room's occupation, by a housekeeper.

It should be appreciated that information captured and/or stored according to the present invention may be utilized in various combinations to provide enhanced features. For example, the system may form a knowledge base associated with individuals and "learn" that individuals preferences.

Accordingly, information that a particular individual is entering a guest room may result in the thermostat in that room being adjusted according to that individual's preference and/or a radio turned on and tuned to a radio station consistent with the individual's taste.

The systems and devices of the present invention may be leveraged to provide functionality in addition to that described above, if desired. For example, where relatively high bandwidth communication links are established between devices of the system, such as local hosts and facility servers of the present invention, excess communication capacity may be utilized for purposes other than providing access and accumulating access records. Accordingly, high bandwidth Internet access points may be provided in the guest rooms using systems of the present invention. Such a use of the present system may be particularly attractive in a bungalow situation, wherein infrastructure for providing such Internet access is not otherwise available and not easily or inexpensively deployed.

Although preferred embodiments have been described herein with reference to biometric scanners capturing fingerprint biometric data, embodiments of the present invention may utilize additional or alternative biometric data, if desired. For example, biometric data, such as retinal mapping, voiceprint, DNA mapping, facial feature profiling, and the like may be utilized according to the present invention.

It should be appreciated that there may be privacy concerns with respect to the identification of individuals, granting of access, and accumulation of access records using biometric data such as fingerprint biometric data. Accordingly, embodiments of the present invention do not actually acquire a biometric map or other detailed rendition of the biometric signature sampled, but instead create a unique vector based upon the biometric sample. Accordingly, the biometric data stored in such an embodiment cannot be used to directly identify an individual, but instead provides a reference for comparison of a subsequently acquired biometric sample processed using the same algorithms to produce a vector. Moreover, it is not necessary that an individual actually be identified within the system. Instead, unique references, such as a personal identification number, may be utilized in the system to ensure privacy with respect to the individual's use of the environment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing access with respect to a hotel, said system comprising:

a facility server providing centralized storage of information with respect to individuals authorized for said access, wherein said information includes biometric sample data associated with said individuals;

a front desk user terminal in communication with said facility server and operable under control of an application program for registering one or more said individuals as guests of said hotel and capturing said biometric sample data, wherein said front desk user terminal is in communication with said facility server via a first local host; and a room user terminal in communication with said facility server and operable to capture biometric data for real-time comparison to said biometric sample data and to release a lock as a function of said comparison, wherein said room user terminal is in communication with said facility server via a second local host;

wherein said first and second local hosts provide localized storage of at least a portion of said information with respect to said individuals authorized for said access, wherein said information includes said biometric sample data associated with said individuals.

2. The system of claim 1, wherein said facility server further provides centralized storage of access records with respect to said access by said individuals.

3. The system of claim 1, wherein said front desk user terminal comprises a mobile user terminal having wireless communication capability.

4. The system of claim 3, wherein said registration of an individual as a guest is accomplished outside of a registration office of said hotel, thereby allowing said individual to proceed to an assigned room without stopping at said registration office.

5. The system of claim 1, wherein said room user terminal comprises a room entry door device.

6. The system of claim 1, wherein said room user terminal comprises a mini-bar device.

7. The system of claim 1, wherein said room user terminal comprises a room safe device.

8. The system of claim 1, further comprising a room occupancy detecting device coupled to said room user terminal.

9. The system of claim 8, further comprising a room occupancy status display coupled to said user terminal, wherein said room occupancy status display is updated as a function of operation of said room occupancy detecting device.

10. The system of claim 1, further comprising:

a restaurant user terminal in communication with said facility server and operable under control of an application program for settling a guest check of said one or more said individuals registered as guests of said hotel by capturing biometric data for real-time comparison to said biometric sample data.

11. The system of claim 1, further comprising:

a retail user terminal in communication with said facility server and operable under control of an application program for conducting a transaction with said one or more said individuals registered as guests of said hotel by capturing biometric data for real-time comparison to said biometric sample data.

* * * * *